(12) United States Patent
Müllenborn et al.

(10) Patent No.: US 7,592,964 B2
(45) Date of Patent: Sep. 22, 2009

(54) SHIELDED COIL FOR INDUCTIVE WIRELESS APPLICATIONS

(75) Inventors: Matthias Müllenborn, Smørum (DK); Frank Engel Rasmussen, Smørum (DK); Mohamad Essabar, Smørum (DK); Mogens Øllgaard, Smørum (DK); Christian Nielsen, Smørum (DK)

(73) Assignee: Oticon A/S, Smorum (DK)

( * ) Notice: Subject to any disclaimer, the term of this patent is extended or adjusted under 35 U.S.C. 154(b) by 333 days.

(21) Appl. No.: 11/600,743

(22) Filed: Nov. 17, 2006

(65) Prior Publication Data
US 2007/0115198 A1    May 24, 2007

(30) Foreign Application Priority Data
Nov. 17, 2005   (EP)   ................... 05110860

(51) Int. Cl.
*H01Q 7/08* (2006.01)
(52) U.S. Cl. .................. 343/788; 343/718; 343/841
(58) Field of Classification Search ................. 343/702, 343/718, 787, 788, 841
See application file for complete search history.

(56) References Cited

U.S. PATENT DOCUMENTS

| | | | | |
|---|---|---|---|---|
| 2,233,748 | A | | 3/1941 | Rust |
| 2,981,950 | A | * | 4/1961 | Skidmore .................. 343/788 |
| 3,721,989 | A | * | 3/1973 | Christensen ................ 343/701 |
| 5,568,162 | A | * | 10/1996 | Samsel et al. ............... 343/842 |
| 6,424,820 | B1 | | 7/2002 | Burdick et al. |
| 2001/0038355 | A1 | | 11/2001 | Fuchs et al. |
| 2005/0104781 | A1 | | 5/2005 | Notohara et al. |
| 2005/0134516 | A1 | | 6/2005 | Du |

FOREIGN PATENT DOCUMENTS

| | | | |
|---|---|---|---|
| DE | 3615037 | A1 | 11/1987 |
| DE | 4326358 | C1 | 11/1994 |
| DE | 10302801 | A1 | 8/2004 |
| WO | WO-91/10243 | A1 | 7/1991 |

* cited by examiner

*Primary Examiner*—HoangAnh T Le
(74) *Attorney, Agent, or Firm*—Brich, Stewart, Kolasch & Birch, LLP

(57) ABSTRACT

The present invention relates to a surface mounted coil (200) for wireless communication. The coil (200) comprises a wire (202) wounded about a core (204) thereby establishing a plurality of windings and having its ends terminated on mounting sections (208) at each end of the core (204). The coil (200) further comprises a shielding layer (212, 300) wound about a central part of the core (204) thereby covering said windings. The shielding layer (212, 300) comprises a shielding pattern and a contact section (214) for connecting to a ground level and to the shielding pattern.

23 Claims, 2 Drawing Sheets

- Prior Art -

SHIELDED COIL FOR INDUCTIVE WIRELESS APPLICATIONS

FIELD OF INVENTION

This invention relates to a shielded coil for wireless applications such as between a set of hearing aids or between a hearing aid and an accessory device.

BACKGROUND OF INVENTION

Near field wireless transmission is increasingly becoming a required feature in a wide variety of consumer goods as well as medical instruments such as for example hearing aids.

In particular in hearing aids inductive coupling is utilised as a wireless transmission means due to minimal power and space available in hearing aids. Therefore miniature coils are incorporated in hearing aids enabling communication either between associated hearing aids or between hearing aids and a remote controller.

German patent no.: DE 198 18 040 discloses a surface mounted device (SMD) coil comprising a duroplastic supporting body with a recess for receiving a flat soldering wire, wherein the flat soldering wire is pressed into the recess ensuring that the flat soldering wire cannot rotate, while leaving a free space allowing slight variations in tolerances.

Further, German patent no.: DE 36 15 037 discloses an SMD coil comprising a ferrite or ceramic supporting body having a length of 3.2 mm. The supporting body has enlarged end pieces with contact plates with recesses for receiving coil wire ends.

The German patents identified above generally describe small inductors to be used in various electronic circuits but not as an antenna. Further, neither of the described inductors is ideal for communication purposes since they are both sensitive to electric field disturbances.

International patent application no.: WO 2005/006491 discloses a loop antenna for receiving data from a non-contact IC-card and attenuating the distant electric field with the attenuation of near magnetic field. The loop antenna has an electromagnetic shield over at least one side of its body, which shield comprises a plurality of electric conductors, a ground contact and a lead wire for connecting the plurality of electric conductors to the ground contact.

However, the loop antenna described in the International patent application is of considerable size. Thus the loop antenna is not suitable for implementation in small sized consumer goods such as a hearing aid. In addition, the shield applied in the loop antenna is complicated to accomplish in fabrication of small and delicate sized antennas.

In addition, International patent application no.: WO 2001/052598 discloses a packaged telecommunication-coil assembly generally referred to as a telecoil, and having a casing shielding the telecoil against radio frequency signals. However, the disclosed casing presents a solution which takes up significant space and thus in hearing aid technology further minimizations are required as well as an improved shielding effect.

SUMMARY OF THE INVENTION

An object of the present invention is therefore to provide a shielded coil for wireless transmissions overcoming the problems described in relation to the prior art.

It is a further object of the present invention to provide a shielded antenna sized for integration in a hearing aid.

A particular advantage of the present invention is the provision of a shield, which significantly improves the production and lowers the failure rate during the production.

The above objects and advantage together with numerous other objects, advantages and features, which will become evident from below detailed description, are obtained according to a first aspect of the present invention by a surface mounted coil antenna for wireless communication, and comprising a wire wounded about a core thereby establishing a plurality of windings and having its ends connected to mounting sections at each end of said core, and wherein said surface mounted coil further comprising a shielding layer provided between mounting sections thereby covering said windings, said shielding layer comprising a shielding pattern and a contact section for connecting to a reference level and to said shielding pattern.

The term "reference level" is in this context to be construed as a signal reference such as a ground level or zero level.

The core according to the first aspect of the present invention may comprise soft-magnetic material, such as ferrite. It is particularly advantageous that the coil is manufactured in as few parts as possible, and thus by injection moulding the entire core including the mounting sections in a soft-magnetic material reduces the number of parts required. In this manner the production requirements are simplified and the production cost thereby reduced.

The coil according to the first aspect of the present invention may have an axial length in the range of 1 to 10 mm, such as between 2 and 9 mm, between 3 and 8 mm, between 4 and 7 mm, or between 5 and 6 mm, or such between 1 and 3 mm, between 3 and 5 mm, between 5 and 7 mm, or between 7 and 10 mm. The coil may thus advantageously be used in a hearing aid for enabling wireless communication between a set of hearing aids or between an accessory device and a hearing aid.

The shielding layer according to the first aspect of the present invention may comprise a flexible substrate, printed circuit board, printed wired board, or any combination thereof. Alternatively, the shielding layer may comprise a non-conducting layer provided between mounting sections thereby covering the windings and a conducting layer comprising the shielding pattern. The non-conducting layer may be established by a fluidized bed process, by chemical vapour deposition of polymers such as Parylene, by dip coating, by spray coating, by electrochemical deposition or by a printing process, such as a jet or laser process. The conducting layer may be established by non-selective electrochemical deposition followed by physical or chemical structuring, by selective electrochemical deposition, by non-selective chemical or physical vapour deposition followed by physical or chemical structuring or by similar additive manufacturing or general masking techniques.

The shielding pattern according to the first aspect of the present invention may comprise one or more conductive tracks single ended connected to the contact section. The one or more conductive tracks forming the shielding pattern may take any shape such as a comb shape or snake shape. The shape of the conductive tracks i.e. the shielding pattern may be formed in order to achieve a wide variety of shielding effects thus allowing the shielding effects to be optimized according to any situation.

Further, the shielding pattern may comprise a series of conductive tongs extending from a longitudinal conductive path. The conductive tongs define a width, which may vary along the longitudinal conductive axis. That is, each of the series of conductive extensions may comprise a shielding area, and the shielding areas of the series of conductive exten-_ sions may vary in accordance with position relative to the longitudinal conductive path. Hence the shielding area may at one end of the longitudinal conductive path be greater than the other end. For example, the shielding at one end of the longitudinal conductive path, i.e. one end of the surface mounted coil, may be more sensitive to electric field than the other end of the surface mounted coil and therefore the shielding area is greater in the more sensitive regions.

In addition or alternatively, the conductive tongs define a width, which may vary along a direction perpendicular to said longitudinal conductive axis. That is, the longitudinal width of each of the shielding areas of the tongs may vary so that the width of distal end of the conductive extension is smaller than the width of proximal end of the conductive extension. Obviously, the overall area of all the shielding areas should be kept as low as possible to avoid the influence of eddy currents, while the overall area of the shielding areas is provided so as to reduce the effect of the electric field on the surface mounted coil.

The longitudinal conductive path according to the first aspect of the present invention may be positioned between mounting sections with the series of conductive tongs folded circumferentially about the plurality of windings. The positioning of the longitudinal conductive path between the mounting sections ensures that the greatest shielding area is directed towards the printed circuit board on which the surface mounted coil is mounted and the smallest shielding area is directed away form this printed circuit board, and thereby the surface mounted coil is advantageously shielded against electric near field generated by electronic components on the printed circuit board.

In fact, the shielding pattern according to the first aspect of the present invention may comprise a second antenna adapted to operate at a frequency range different from operating frequency of the coil. The second antenna may be a capacitive antenna. Thus the coil may communicate wirelessly at radiofrequencies within a first frequency range while the second antenna communicates at radiofrequencies within a second frequency range. The first frequency range may be shifted downwards relative to the second frequency range, such as the first frequency range may be within 2 to 8 MHz while the second frequency range may be within 1 to 5 GHz. The first frequency range may be adapted for operation in accordance with a proprietary protocol while the second frequency range may be adapted for operation in accordance with non-proprietary protocol, such as Bluetooth.

The above objects, advantages and features together with numerous other objects, advantages and features, which will become evident from below detailed description, are obtained according to a second aspect of the present invention by a hearing aid comprising a surface mounted coil for wireless communication according to the first aspect of the present invention.

The above objects, advantages and features together with numerous other objects, advantages and features, which will become evident from below detailed description, are obtained according to a third aspect of the present invention by a shielding layer for shielding an antenna for wireless communication and comprising a tape, a flexible substrate, a printed circuit board, a printed wired board, or any combination thereof and having a shielding pattern comprising one or more conductive tracks single ended connected to a contact section.

The shielding layer according to the third aspect of the present invention may be applied to the coil according to the first aspect of the present invention, and may be used in a hearing aid according to the second aspect of the present invention. The one or more conductive tracks forming the shielding pattern may take any shape such as a comb shape, snake shape.

The shape of the conductive tracks i.e. the shielding pattern may be formed in order to achieve a wide variety of shielding effects thus allowing the shielding effect to be optimized according to any situation.

The hearing aid according to the second aspect and the shielding layer according to the third aspect of the present invention may incorporate any features of the coil according to the first aspect of the present invention and/or any features of one or another.

The above objects, advantages and features together with numerous other objects, advantages and features, which will become evident from below detailed description, are obtained according to a fourth aspect of the present invention by a method for manufacturing a coil according to the first aspect of the present invention and comprising: winding a wire about a core thereby establishing a plurality of windings and connecting its ends to mounting sections at each end of said core, adding a shielding layer comprising a non-conductive layer and a conductive pattern between said mounting sections, and connecting a contact section to a reference level and to said shielding pattern.

The non-conductive layer according to the fourth aspect of the present invention may be deposited on top of the coil windings by a fluidized bed process, by a chemical vapour deposition process, by dip coating process, by spray coating process, by electrochemical deposition or a printable process. Alternatively, the shielding pattern may be positioned on the non-conductive layer such as a tape, a flexible substrate, a printed circuit board, a printed wired board, or any combination thereof, folded circumferentially about the plurality of windings. Further, the shielding pattern according to the fourth aspect may comprise a contact pad and conductive tracks established by a non-selective electrochemical deposition process followed by physical or chemical structuring, by selective electrochemical deposition process, by non-selective chemical or physical vapour deposition process followed by physical or chemical structuring, or in a printing process. Any of these processes may be utilized for implementing the shielding layer on the coil.

The method according to the fourth aspect of the present invention may incorporate any features of the coil according to the first aspect the hearing aid according to the second aspect, and/or the shielding layer according to the third aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilized and structural and functional modifications may be made without departing from the scope of the present invention.

Figure 1:
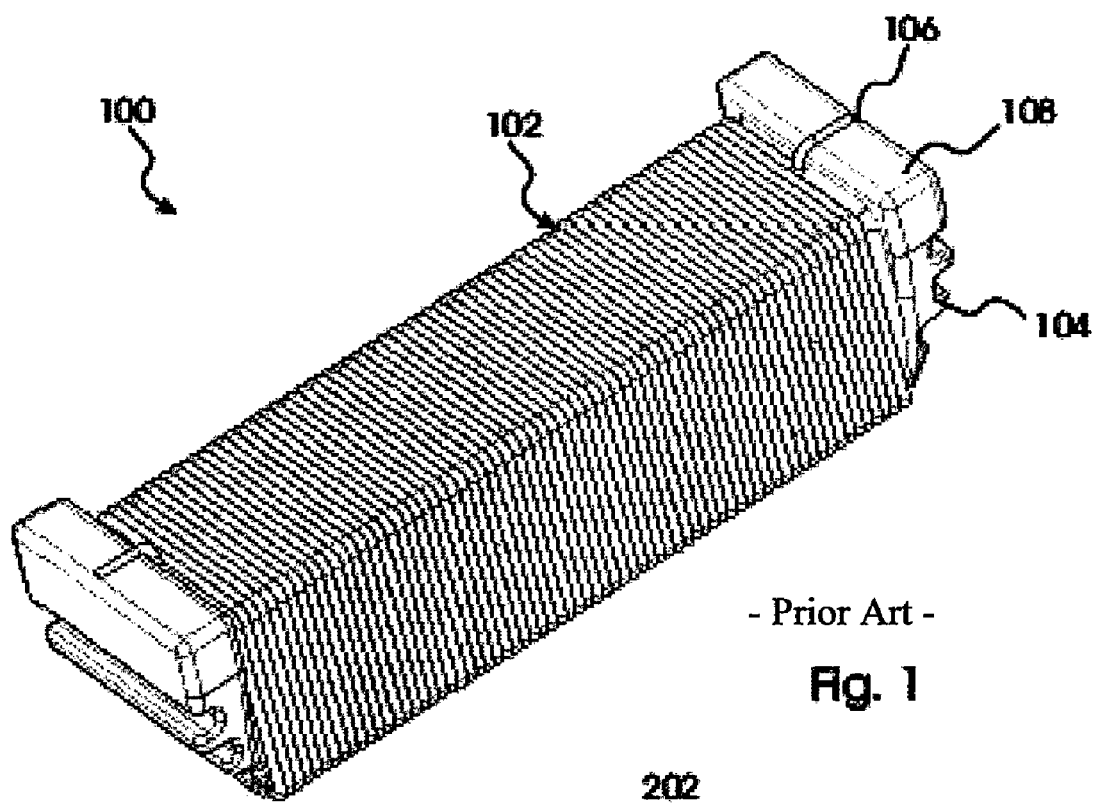
FIG. 1, shows a coil for inductive wireless transmission according to prior art techniques.

FIG. 1, shows a coil 100 for inductive wireless transmission. The coil 100 comprises a wire 102 wound about a central portion of a core 104. The wire forms a series of loops which when placed in a magnetic field experience induced electromotive force causing a current to flow from one end of the coil to the other and generating a voltage, for example as used during reception, or when excited by a driving current causing a magnetic field to be induced, for example as used during transmission. The core 104 is made of a soft-magnetic material, such as ferrite, with high permeability and narrow hysteresis thus allowing a high magnetic flux density within the core 104 and therefore more sensitive to magnetic fields. At each end of the core 104 the wire 102 is terminated in a recess 106 on a mounting foot 108.

Figure 2:
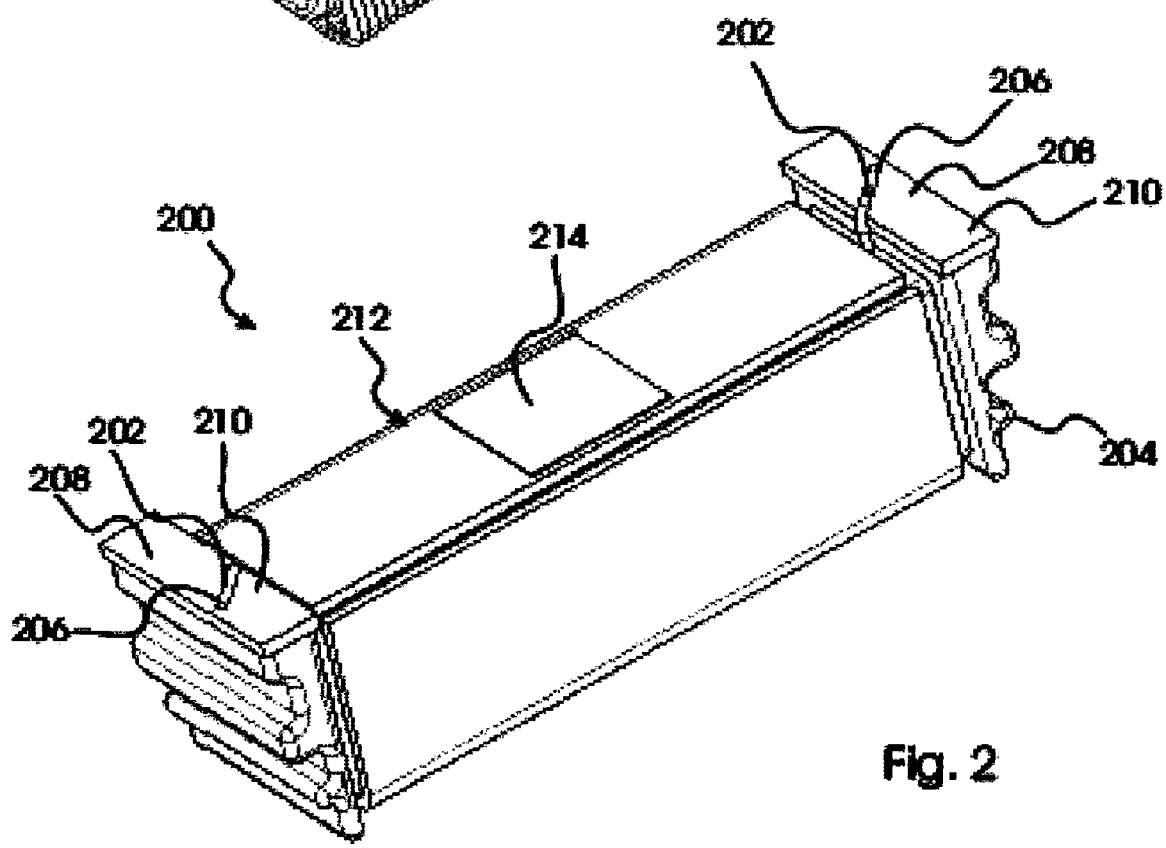
FIG. 2, shows a shielded coil for inductive wireless transmission according to a first embodiment of the present invention.

FIG. 2, shows a coil 200 according to a first embodiment of the present invention, which coil 200 operating as an antenna provides inductive wireless transmission such as used between a set of hearing aids or between a hearing aid and an accessory device. The accessory device may be a remote control, an ordinary or cellular telephone, a sound enhancing system such as Lexis®, a gateway between communications protocols such as between Bluetooth and proprietary protocol.

The coil 200 comprises, as described above with reference to FIG. 1, a wire 202 wound about a core 204 and terminated in a recess 206 on a mounting foot 208 on each side of the core 204.

Each mounting foot 208 comprises an electrically conducting mounting layer 210 to engage with an electrical contact within a consumer device, such as a printed circuit board (PCB) in a hearing aid.

The coil 200 further comprises a shield 212 made of a flexible foil layer, such as a tape, a flexible substrate, and printed circuit board (PCB) or a printed wire board (PWB). The shield 212 is wound about the central part of the core 204 covering the windings of the wire 202. The shield 212 comprises a contact pad 214 for connecting to a reference level, such as ground.

In an alternative embodiment of the present invention the shield 212 comprises a non-conductive layer is deposited on the central part of the core 204 between the mounting feet 208, and the contact pad 214 as well as conductive tracks are applied as a conductive layer using additive manufacturing, such as M³D technology.

In a further alternative embodiment, the non-conductive layer on top of the coil windings can be established by methods such as in a fluidized bed process, by chemical vapour deposition of polymers, such as Parylene, by dip coating, by spray coating, by electrochemical deposition or in a printable process. The contact pads as well as the conductive tracks may, alternatively, be established by non-selective electrochemical deposition followed by physical or chemical structuring, by selective electrochemical deposition, by non-selective chemical or physical vapour deposition followed by physical or chemical structuring, or in a printing process.

The core 204 is injection moulded from a soft-magnetic material, such as ferrite, so as to improve the overall magnetic sensibility of the coil 200. Utilising injection moulding for manufacturing of the core 204 simplifies production, thus presents a low cost and simple alternative to the bulky and hard to manage prior art technologies.

FIGS. 3a through 3i, show a plurality of types of a shield 300 for winding about the coil 200, the types are shown relative to longitudinal axis 308 of the coil 200. The shield 300 comprises a first layer 302 supporting a conductive track 304. The shield 300 further comprises a contact pad 306 (corresponding to 214 described with reference to FIG. 1), which advantageously is placed in the middle of the first layer 302 since this placement presents a solution wherein the distances from the distal ends of the conductive tracks 304 to the contact pad are substantially identical. Generally the conductive tracks 304 are coupled single-ended to the contact pad so as to prevent deterioration of Q-factor.

The shield 300 may be utilised as a second antenna adapted to operate at a frequency range, which is different from the operating frequency of the coil 200. Thus the coil 200 communicates wirelessly at radiofrequencies within a first frequency range while a second, e.g. capacitive, antenna communicates at radiofrequencies within a second frequency range. The first frequency range is shifted downwards relative to the second frequency range. For example, the first frequency range is within the frequency range 2 to 8 MHz while the second frequency range is within the frequency range 1 to 5 GHz. This second utilisation of the shield is particularly advantageous for consumer or medical products, since it provides a separate communications channel within a product system, such as a set of hearing aids, to be maintained by one antenna, while communication between product systems, such as between one or more sets of hearing aids and a remote controller or service provider, is maintained on another antenna. That is, this feature provides a the first frequency range adapted for operation in accordance with a proprietary protocol while the second frequency range is adapted for operation in accordance with, for example, a Bluetooth protocol.

As it would be known to persons skilled in the art the information obtained from the shield 300 operating as a second antenna is filtered from the information obtained from the coil 200 by ordinary capacitive decoupling.

Figure 3A:
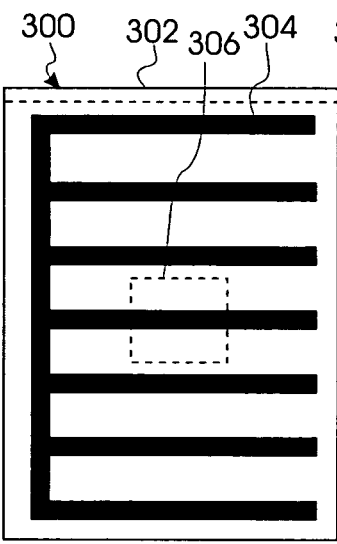
FIG. 3*a* through 3*i*, show various types shields for the shielded coil according to the first embodiment.
Figure 3B:
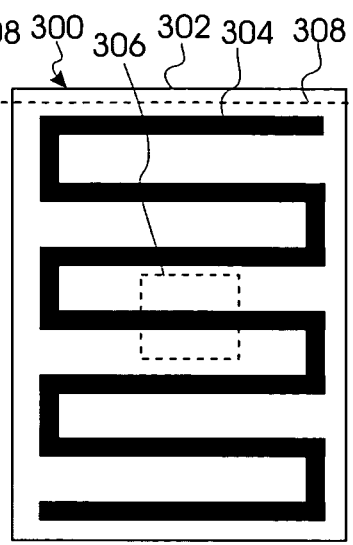
Figure 3C:
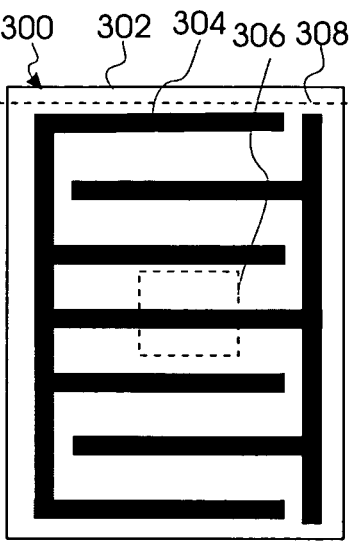
Figure 3D:
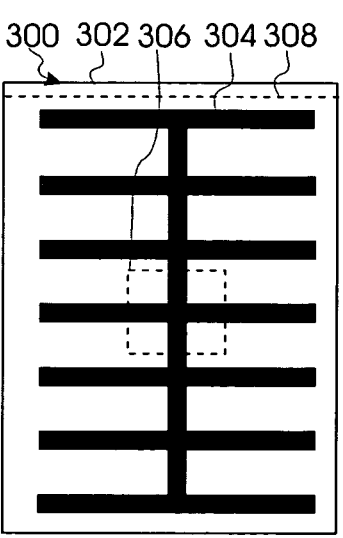
Figure 3E:
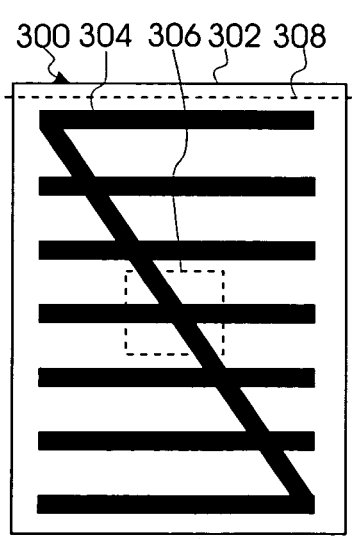
Figure 3F:
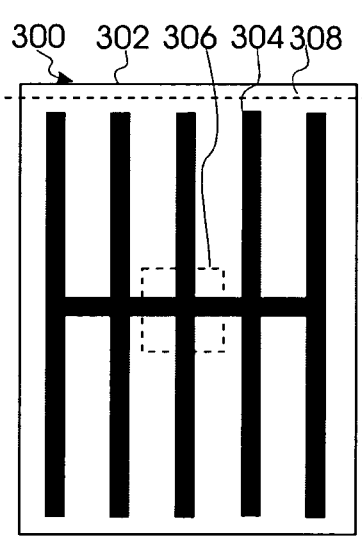
Figure 3G:
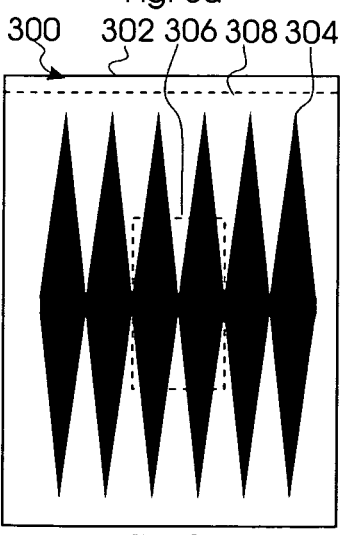
Figure 3H:
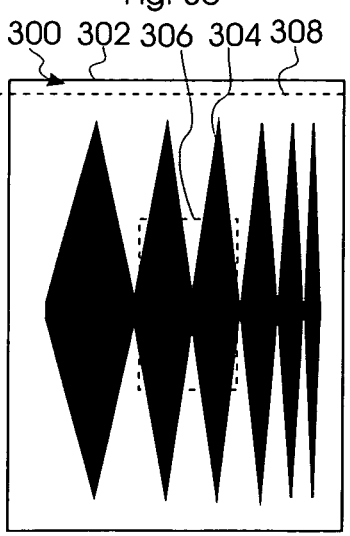
Figure 3I:
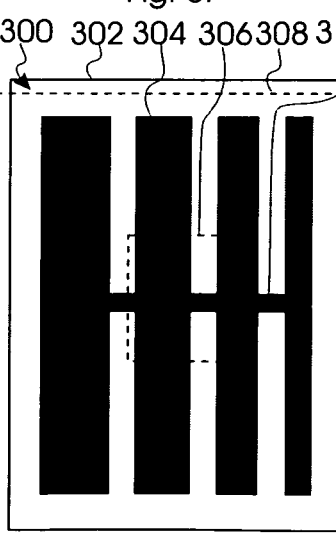

In addition, as FIGS. 3h and 3i show, the shield 300 may comprise conductive tracks 304 defined in an asymmetric pattern enabling a graduation of the shielding effect dependent on the position relative to the longitudinal axis 308 of the first layer 302. This is particularly advantageous in situations where the conductive track 304 is connected singled ended having the larger conductive areas of the conductive track 304 furthest away from the lowest impedance point.

In FIGS. 3h and 3i the shielding area of the conductive tracks 304 at one end of a longitudinal conductive path 310 is greater than the other end. Hence, the shielding at one end of the longitudinal conductive path 310, i.e. one end of the surface mounted coil, is more sensitive to electric field than the other end of the surface mounted coil and therefore the shielding area is greater in the more sensitive regions.

Similarly in FIGS. 3h and 3i, the longitudinal width of each of the shielding areas may vary so that the width of distal end of the conductive tracks 304 is smaller than the width of proximal end. Obviously, the overall area of all the shielding areas is kept as low as possible to avoid the influence of eddy currents, while the overall area of the shielding areas is dimensioned so as to reduce the effect of the electric field on the surface mounted coil.

The longitudinal conductive path 310 is positioned between the mounting feet 208 with the series of conductive tracks 304 folded circumferentially about the core 204. The positioning of the longitudinal conductive path 310 between the mounting feet 208 ensures that the greatest shielding area is directed towards the printed circuit board on which the surface mounted coil 200 is mounted and the smallest shielding area is directed away form this printed circuit board, and thereby the surface mounted coil is advantageously shielded against electric near field generated by electronic components on the printed circuit board supporting the surface mounted coil.

The first layer 302 is advantageously made of a flexible foil such as a tape, a flexible substrate, printed circuit board or printed wire board. This solution provides for the possibility of introducing further conductive tracks on either side of the flexible substrate, printed circuit board or printed wire board. This enables an optimisation of the coil 200 for a variety of operations.

The invention claimed is:

1. A surface mounted coil for wireless communication, the coil comprising
   a wire wound about a core a plurality of times and having its ends connected to mounting sections at each end of said core, each mounting section including an electrically conductive mounting layer that engages with an electrical contact within a consumer device; and
   a shielding layer provided between mounting sections, said layer covering the coil windings and including a shielding pattern and a contact section that connects to a reference level and to said shielding pattern.

2. The coil according to claim 1, wherein said core comprises a soft-magnetic material.

3. The coil according to any of claims 1 or 2, wherein said shielding layer includes a non-conductive layer made of at least one non-conductive or dielectric material.

4. The coil of claim 3, where the non-conductive or dielectric material includes at least one of a tape, a flexible substrate, a printed circuit board, a printed wired board.

5. The coil according to claim 1, wherein said shielding pattern comprises one or more conductive tracks connected single ended to said contact section.

6. The coil according to claim 1, wherein said shielding pattern includes at least one of a comb shape, and a snake shape.

7. The coil according to claim 1, wherein said shielding pattern comprises a series of conductive tongs extending from a longitudinal conductive axis.

8. The coil according to claim 7, wherein said series of conductive tongs extends from either side of said longitudinal conductive path, which is positioned between said mounting sections with the series of conductive tracks folded circumferentially about said plurality of windings.

9. The coil according to claim 1, wherein said shielding pattern comprises a second antenna adapted to operate at a frequency range different from operating frequency of the coil.

10. The coil according to claim 9, wherein said coil is adapted to communicate wirelessly at radiofrequencies within a first frequency range while said second antenna is adapted to communicate at radiofrequencies within a second frequency range.

11. The coil according to claim 10, wherein said first frequency range is shifted downwards relative to said second frequency range.

12. The coil according to claim 10, wherein said first frequency range is adapted for operation in accordance with a proprietary protocol while said second frequency range is adapted for operation in accordance with a non-proprietary protocol.

13. The coil according to claim 1, wherein said coil has an axial length between 1 to 10 mm.

14. A hearing aid, the hearing aid comprising a surface mounted coil for inductive wireless communication according to claim 1; and
   an audio signal processing portion that detects ambient sounds and produces an audio output signal based on said detected sounds.

15. A surface mounted coil for wireless communication, the coil comprising
   a wire wound about a core a plurality of times and having its ends connected to mounting sections at each end of said core; and
   a shielding layer provided between mounting sections and covering said windings, said shielding layer including a shielding pattern and a contact section for connecting to a reference level and to said shielding pattern, and
   wherein said shielding pattern includes a series of conductive tongs extending from a longitudinal conductive axis such that the conductive tongs define a width varying along said longitudinal conductive axis.

16. A surface mounted coil for wireless communication, the coil comprising
   a wire wound about a core a plurality of times and having its ends connected to mounting sections at each end of said core; and
   a shielding layer provided between mounting sections and covering said windings, said shielding layer including a shielding pattern and a contact section for connecting to a reference level and to said shielding pattern, and
   wherein said shielding pattern includes a series of conductive tongs extending from a longitudinal conductive axis such that the conductive tongs define a width varying along a direction perpendicular to said longitudinal conductive axis.

17. A shielding layer for shielding an antenna for inductive wireless communication the layer comprising:
   at least one non-conductive material; and
   shielding pattern including one or more conductive tracks single ended connected to a contact section and a series of conductive tongs extending from a longitudinal conductive axis such that the tongs define a width varying along said longitudinal conductive axis.

18. A method for manufacturing a surface mounted coil for wireless communication, the method comprising:
   winding a wire about a core a plurality of times; and
   connecting ends of said wire to mounting sections at each end of said core, where each mounting section includes an electrically conductive mounting layer that engages with an electrical contact within a consumer device,
   adding a shielding layer that includes a non-conductive layer and a conductive shielding pattern, between said mounting sections, said adding including covering the coil windings with the shielding layer, and
   connecting a contact section to a reference level and to said shielding pattern.

19. The method according to claim 18, said covering the coil windings including depositing the non-conductive layer on top of said coil windings by a fluidized bed process, by a chemical vapour deposition process, by dip coating process, by spray coating process, by electrochemical deposition or a printable process.

20. The method according to claim 18, said covering the coil windings including positioning said shielding pattern on said non-conductive layer and
   folding said shielding pattern circumferentially about said plurality of windings.

21. The method of claim 20, where said non-conductive layer includes at least one of a tape, a flexible substrate, a printed circuit board, a printed wired board.

22. The method according to claim 18, wherein said adding a shielding layer comprises creating, as part of the shielding pattern, a contact pad and conductive tracks by a non-selective electrochemical deposition process followed by physical or chemical structuring, by selective electrochemical deposition process, by non-selective chemical or physical vapour deposition process followed by physical or chemical structuring, or in a printing process.

23. A shielding layer for shielding an antenna for inductive wireless communication, the layer comprising:
  at least one non-conductive material; and
  a shielding pattern including one or more conductive tracks single ended connected to a contact section, where said pattern is disposed on said non-conductive material, and further where said shielding pattern includes a series of conductive tongs extending from a longitudinal conductive axis such that the tongs define a width varying along a direction perpendicular to said longitudinal conductive axis.

* * * * *